United States Patent
Walters et al.

(10) Patent No.: US 8,875,596 B2
(45) Date of Patent: Nov. 4, 2014

(54) STEERING WHEEL WITH AT LEAST ONE SHIFT PADDLE

(75) Inventors: Markus Walters, Stuttgart (DE); Manfred Harrer, Stuttgart (DE); Georg Wahl, Pforzheim (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 727 days.

(21) Appl. No.: 12/881,530

(22) Filed: Sep. 14, 2010

(65) Prior Publication Data
US 2011/0061488 A1 Mar. 17, 2011

(30) Foreign Application Priority Data
Sep. 15, 2009 (DE) .......................... 10 2009 042 497

(51) Int. Cl.
*B62D 1/04* (2006.01)
*F16H 59/02* (2006.01)
*F16H 61/24* (2006.01)

(52) U.S. Cl.
CPC ................ *F16H 59/02* (2013.01); *F16H 61/24* (2013.01); *F16H 2059/0247* (2013.01)
USPC ......... 74/552; 74/473.21; 74/473.28; 477/99; 200/291; 200/556

(58) Field of Classification Search
CPC .. F16H 59/02; F16H 2059/0247; F16H 61/24
USPC .................. 74/552; 200/61.54, 308, 556, 291
IPC ....................................................... H01H 25/04
See application file for complete search history.

(56) References Cited

U.S. PATENT DOCUMENTS

| | | | |
|---|---|---|---|
| 3,571,545 A * | 3/1971 | Haderer | 200/291 |
| 4,519,266 A | 5/1985 | Reinecke | |
| 5,156,243 A * | 10/1992 | Aoki et al. | 192/218 |
| 5,446,253 A * | 8/1995 | Oshgan | 200/556 |
| 5,542,512 A | 8/1996 | Maehara | |
| 6,055,881 A | 5/2000 | Oda | |
| 6,120,412 A * | 9/2000 | Fujinuma | 477/99 |
| 6,586,692 B2 | 7/2003 | Agetsuma | |

(Continued)

FOREIGN PATENT DOCUMENTS

| | | |
|---|---|---|
| CN | 10 134 286 8 A | 1/2009 |
| DE | 603 09 999 T2 | 9/2007 |

(Continued)

OTHER PUBLICATIONS

PTO Translation of JP 60-175439, Minoru Izawa, Nov. 20, 1985.*

(Continued)

*Primary Examiner* — Vinh Luong
(74) *Attorney, Agent, or Firm* — Leydig, Voit & Mayer, Ltd.

(57) ABSTRACT

A steering wheel has at least one shift paddle which is coupled to the steering wheel in such a manner that the shift paddle is movable relative to the steering wheel in order in a contactless manner to trigger a shifting operation. In order to improve the ease of operation when actuating the shift paddle on the steering wheel, the steering wheel is distinguished by a slotted guide mechanism by which a shifting sensation is generated during movement of the shift paddle.

11 Claims, 2 Drawing Sheets

(56) References Cited

U.S. PATENT DOCUMENTS

| | | |
|---|---|---|
| 7,467,569 B2 * | 12/2008 | Wang .................. 74/473.21 |
| 8,143,539 B2 * | 3/2012 | Muramatsu et al. ....... 200/61.54 |
| 8,158,897 B2 | 4/2012 | Rosman et al. |
| 2003/0010145 A1 | 1/2003 | Seekircher |
| 2003/0154813 A1 * | 8/2003 | Molde et al. .............. 74/473.28 |
| 2004/0050673 A1 * | 3/2004 | Takahashi et al. ......... 200/61.54 |
| 2006/0201272 A1 | 9/2006 | Syamoto et al. |
| 2008/0202906 A1 * | 8/2008 | Schelbert et al. ............. 200/308 |
| 2009/0201013 A1 | 8/2009 | Wang et al. |
| 2010/0200376 A1 | 8/2010 | Takahashi et al. |

FOREIGN PATENT DOCUMENTS

| | | | |
|---|---|---|---|
| DE | 601 32 289 T2 | 5/2008 | |
| EP | 1394829 A2 | 3/2004 | |
| JP | 60175439 U | 11/1985 | |
| JP | 08054947 A | 2/1996 | |
| JP | 8324283 A | 12/1996 | |
| JP | H08-324283 A | 12/1996 | |
| JP | 2002166833 A | 6/2002 | |
| JP | 2003118587 A | 4/2003 | |
| JP | 2004-82936 A | 3/2004 | |
| JP | 2005104423 A | 4/2005 | |
| JP | 2009035099 A | 2/2009 | |
| WO | WO 2010/083848 A1 * | 7/2010 | ............. F16H 61/24 |

OTHER PUBLICATIONS

Great Britain Search Report dated Dec. 1, 2010.

German Patent and Trademark Office Search Report, Dated April 22, 2010.

* cited by examiner ional application DE 10 2009 042 497.0, filed Sep. 15,
STEERING WHEEL WITH AT LEAST ONE SHIFT PADDLE

CROSS-REFERENCE TO RELATED APPLICATION

This application claims the priority, under 35 U.S.C. §119, of German application DE 10 2009 042 497.0, filed Sep. 15, 2009; the prior application is herewith incorporated by reference in its entirety.

BACKGROUND OF THE INVENTION

Field of the Invention

The invention relates to a steering wheel with at least one shift paddle which is coupled to the steering wheel in such a manner that the shift paddle is movable relative to the steering wheel in order in a contactless manner to trigger a shifting operation. The invention furthermore relates to a motor vehicle with a steering wheel of this type.

SUMMARY OF THE INVENTION

It is accordingly an object of the invention to provide a steering wheel with at least one shift paddle which overcomes the above-mentioned disadvantages of the prior art devices of this general type, which improves the ease of operation when actuating the shift paddle on the steering wheel.

With the foregoing and other objects in view there is provided, in accordance with the invention a steering wheel configuration. The steering wheel configuration contains a steering wheel and at least one shift paddle is coupled to the steering wheel such that the shift paddle is movable relative to the steering wheel in order in a contactless manner to trigger a shifting operation. A slotted guide mechanism is provided by which a shifting sensation is generated during movement of the shift paddle.

The object is achieved in a steering wheel with at least one shift paddle which is coupled to the steering wheel in such a manner that the shift paddle is movable relative to the steering wheel in order in a contactless manner to trigger a shifting operation, by a slotted guide mechanism by which a shifting sensation is generated during movement of the shift paddle. When shifting gears using the shift paddle, the contactless triggering of the shifting operation means that no resistance can be felt, i.e. the shifting operation cannot be haptically detected. By the additional slotted guide mechanism, a resistance is artificially generated when shifting gears using the shift paddle, the resistance, directly when shifting gears, haptically imparting to a driver that a shifting operation is taking place or has taken place. A shift paddle denotes a type of shift lever which is mounted at one end, preferably pivotably, on the steering wheel.

A preferred exemplary embodiment of the steering wheel is characterized in that the slotted guide mechanism interacts with a slide which is prestressed against the slotted guide mechanism. By the prestressing, the slide is kept in contact, preferably at one end, with the slotted guide mechanism. The resistance during the movement of the shift paddle relative to the steering wheel can be varied by the configuration or shape of the slotted guide mechanism and/or of the slide.

Another preferred exemplary embodiment of the steering wheel is characterized in that the slide is prestressed against the slotted guide mechanism by a spring. The spring can be configured, for example, as a helical compression spring. As an alternative, it is also possible to prestress the slide against the slotted guide mechanism by subjecting the slide to a fluid pressure.

Another preferred exemplary embodiment of the steering wheel is characterized in that the slide is guided movably to and fro in a guide body which is mounted on the shift paddle. The configuration of the guide body is preferably matched to the configuration of the slide.

Another preferred exemplary embodiment of the steering wheel is characterized in that the slotted guide mechanism is mounted on the steering wheel. The slotted guide mechanism can be made, for example, of metal or of plastic.

Another preferred exemplary embodiment of the steering wheel is characterized in that the slide has a tapering tip. The tip is configured, for example, in the manner of a cone and is preferably rounded at the end. The cone or truncated cone at the tip of the slide preferably has an angle of taper of approximately 40 to 50 degrees.

Another preferred exemplary embodiment of the steering wheel is characterized in that the slotted guide mechanism has at least one initial bevel. In an unactuated state of the shift paddle, the initial bevel is preferably arranged at an angle of approximately 50 degrees to the axis of movement to and fro of the slide. An initial resistance is generated by the initial bevel when the shift paddle is moved out of the initial position thereof.

Another preferred exemplary embodiment of the steering wheel is characterized in that the initial bevel is divided into two bevel sections which have different bevel angles. The first bevel section is arranged, for example, at an angle of approximately 50 degrees to the axis of movement to and fro of the slide in the unactuated state of the shift paddle. The corresponding angle in the second bevel section is preferably approximately 70 degrees.

Another preferred exemplary embodiment of the steering wheel is characterized in that the slotted guide mechanism has a central bevel which is angled away from the initial bevel. The central bevel is preferably angled away from the initial bevel at an angle which is greater than 90 degrees. The angled-away central bevel means that the resistance upon movement of the shift paddle is greatly increased abruptly in order to impart to the driver, for example, that a shifting operation is being carried out or has been carried out.

Another preferred exemplary embodiment of the steering wheel is characterized in that the central bevel is arranged at an angle of approximately 100 degrees to the initial bevel. This value has proven particularly advantageous within the context of the present invention.

Another preferred exemplary embodiment of the steering wheel is characterized in that the central bevel is spaced apart from an end bevel by a step. The step creates a type of latching point by which it is imparted to the driver, for example, that a particular shifting operation, in particular a kickdown, is being carried out or has been carried out.

Another preferred exemplary embodiment of the steering wheel is characterized in that the end bevel is arranged approximately parallel to the central bevel. The end bevel can also be arranged at a slight inclination with respect to the central bevel.

Another preferred exemplary embodiment of the steering wheel is characterized in that at least one contact sensor, which interacts with at least one light barrier, is mounted on the shift paddle. The contact sensor may also interact with a plurality of light barriers. A plurality of contact sensors may also be mounted on the shift paddle. As an alternative, at least one inductive triggering mechanism may be used.

The invention furthermore relates to a motor vehicle with an above-described steering wheel. Two shift paddles are preferably mounted on the steering wheel. The two shift paddles are preferably arranged diametrically.

Other features which are considered as characteristic for the invention are set forth in the appended claims.

Although the invention is illustrated and described herein as embodied in a steering wheel with at least one shift paddle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
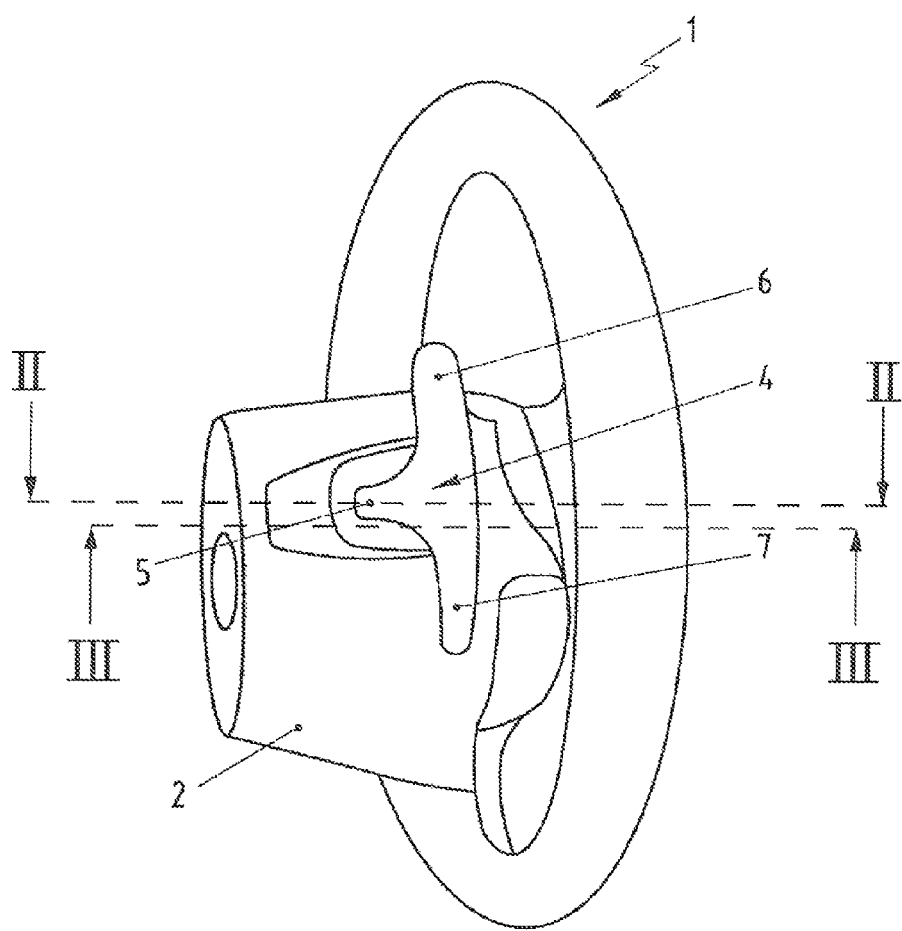
FIG. 1 is a diagrammatic, perspective view of a steering wheel with a shift paddle according to the invention.

Referring now to the figures of the drawing in detail and first, particularly, to FIG. 1 thereof, there is shown a steering wheel 1 with a hub body 2. A shift paddle 4 is mounted movably, in particular pivotably, on the hub body 2 of the steering wheel 1. The shift paddle 4 contains a lever element 5 which is coupled at one end to the hub body 2 of the steering wheel 1. Two actuating arms 6, 7 are angled away from the other end of the lever element 5 in opposite directions.

Figure 2:
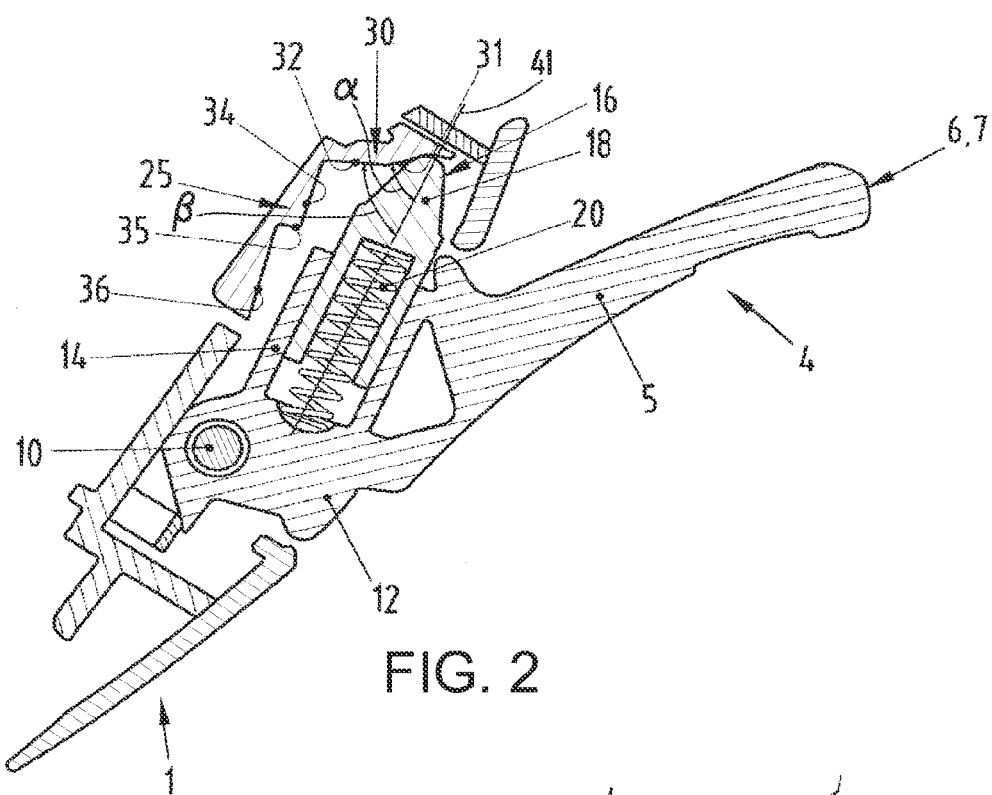
FIG. 2 is a sectional view along plane II-II shown in FIG. 1 through the steering wheel in a region of a slotted guide mechanism for the shift paddle.

FIG. 2 illustrates the view of a section through the steering wheel 1 in the region of a slotted guide mechanism 25. It is seen in the sectional view that the lever element 5 of the shift paddle 4 is mounted pivotably on the steering wheel 1 at a coupling point 10. The shift paddle 4 engages around the coupling point 10 with a coupling body 12 which, in the exemplary embodiment illustrated, is connected integrally to the lever element 5.

A guide body 14 for a slide 16 which is guided movably to and fro in the guide body 14 is fastened to the coupling body 12. The slide 16 projects at one end out of the guide body 14. A tip 18 is formed at the projecting end of the slide 16, the tip being configured in the form of a cone which is rounded at the tip. The angle of taper of the cone is approximately 45 degrees.

The other end of the slide 16 is of hollow configuration on the inside. The slide 16 is prestressed against the slotted guide mechanism 25 by a spring 20. The spring 20 is configured as a helical compression spring and is clamped between the base of the guide body 14 and the slide 16.

The slotted guide mechanism 25 contains an initial bevel 30 with two bevel sections 31, 32. The first bevel section 31 is arranged at an angle $\alpha$ of approximately 50 degrees with respect to the axis of movement 41 of the slide 16 in the unactuated state of the shift paddle 4. The second bevel section 32 is arranged at an angle $\beta$ of approximately 70 degrees to the axis of movement 41 of the slide 16 in the unactuated state of the shift paddle 4.

In the illustrated unactuated state of the shift paddle 4, the tip 18 of the slide 16 bears by the rounded end thereof against the first bevel section 31 of the initial bevel 30. The initial bevel 30 together with the two bevel sections 31, 32 is intended first to prevent unintentional actuation of the shift paddle 4. Second, the bevel sections 31, 32 are arranged in such a manner that an actuation of the shift paddle 4 is countered only by a slight initial resistance. By the kink-like intersection between the two bevel sections 31, 32, it is haptically imparted upon movement of the shift paddle that a shifting operation is being triggered upon continuation of the movement.

A central bevel 34 is angled away from the second bevel section 32 of the initial bevel 30 at an angle of approximately 100 degrees. By this arrangement of the central bevel 34, the resistance to further movement of the shift paddle is significantly, i.e. noticeably, increased as soon as the slide 16 comes to bear against the central bevel 34. As a result, it is haptically imparted to the driver that a shifting operation is being carried out or has been carried out.

A step 35 from which, in turn, an end bevel 36 emerges is formed at that end of the central bevel 34 which faces away from the initial bevel 30. The end bevel 36 is arranged approximately parallel to the central bevel 34. The step 35, which may be of slightly rounded configuration, creates a type of latching point by which a particular shifting operation, such as, for example, a kickdown, can be haptically imparted.

Figure 3:
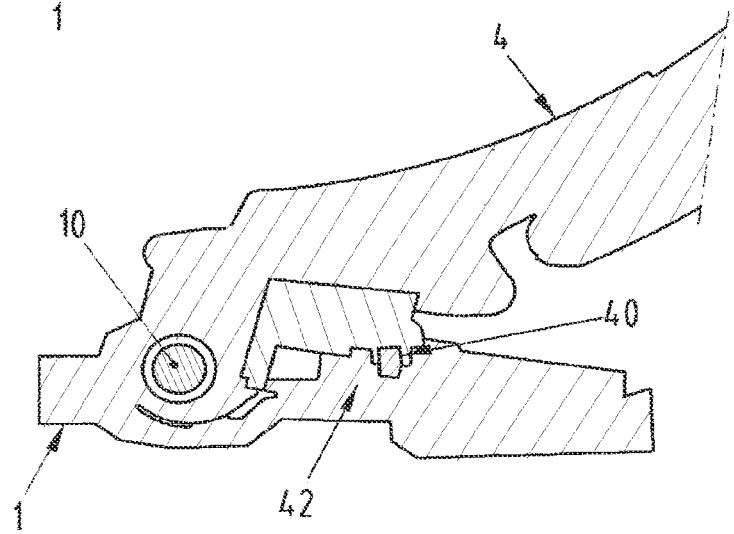
FIG. 3 is a sectional view along plane III-III shown in FIG. 1 through the steering wheel in the region of a triggering mechanism for a shifting operation via the shift paddle.

FIG. 3 illustrates the view of a section through the steering wheel 1 in the region of a contact sensor 40 which is mounted on the shift paddle 4. The contact sensor 40 interacts with a light barrier 42 which is mounted on the steering wheel 1. In order to depict different shifting operations, the contact sensor 40 may interact with a plurality of light barriers. A plurality of contact sensors 40 may also be provided on the shift paddle 4.

By the configuration or shape of the slotted guide mechanism 25 with the different bevels 30, 34 and 36 and the step 35, various shifting operations can be haptically imparted to the driver via a change in the resistance countering the movement of the shift paddle 4.

By the interaction between the slide 16 and the slotted guide mechanism 25, it is noticeably imparted to the driver whether a shifting operation is being triggered or has been triggered and which operation is triggered with the movement of the shift paddle 4. The actual triggering of the operation, in particular the shifting operation, takes place in a contactless manner, i.e. without a noticeable resistance, by the interaction between the contact sensor 40 and light barrier 42.

The invention claimed is:

1. A steering wheel configuration, comprising:
   a steering wheel;
   at least one shift paddle coupled to said steering wheel, said shift paddle being configured to move relative to said steering wheel so as to trigger a shifting operation, the shifting operation being triggered by actuation of a sensor that is triggered in a contactless manner; and
   a slotted guide mechanism that interacts with a slide that is prestressed against said slotted guide mechanism, the slotted guide mechanism including at least one initial bevel that is divided into first and second bevel sections and a central bevel that is angled away from the at least one initial bevel,
   wherein the first bevel section is arranged substantially at an angle of 50 degrees with respect to an axis of movement of said slide in an unactuated state of the shift paddle so that an initial resistance is imparted to the shift paddle through the slide against the first bevel section when starting an actuation of the shift paddle, wherein the second bevel section is arranged substantially at an angle of 70 degrees to the axis of movement of the slide in the unactuated state of the shift paddle, wherein a kink at an intersection between the first and second bevels sections causes a change in the resistance imparted to the shift paddle, and wherein the central bevel imparts a resistance to further movement of the shift paddle as the slide comes to bear against the central bevel.

2. The steering wheel configuration according to claim 1, further comprising a spring and said slide is prestressed against said slotted guide mechanism by said spring.

3. The steering wheel configuration according to claim 1, further comprising a guide body mounted on said shift paddle, said slide being guided movably to and fro in said guide body.

4. The steering wheel configuration according to claim 3, wherein said slotted guide mechanism is mounted on said steering wheel.

5. The steering wheel configuration according to claim 1, wherein said slide has a tapering tip.

6. The steering wheel configuration according to claim 1, wherein said slotted guide mechanism has a central bevel which is angled away from said initial bevel.

7. The steering wheel configuration according to claim 6, wherein said central bevel is disposed substantially at an angle of 100 degrees to said initial bevel.

8. The steering wheel configuration according to claim 6, wherein said slotted guide mechanism has an end bevel and a step, said central bevel is spaced apart from said end bevel by said step.

9. The steering wheel configuration according to claim 8, wherein said end bevel is disposed substantially parallel to said central bevel.

10. The steering wheel configuration according to claim 1, wherein the sensor interacts with at least one light barrier and wherein the sensor is mounted on said shift paddle.

11. A motor vehicle, comprising:

a steering wheel including a hub body;

at least one shift paddle coupled to said steering wheel, said shift paddle being configured to move relative to said steering wheel so as to trigger a shifting operation, the shifting operation being triggered by actuation of a sensor that is triggered in a contactless manner; and a slotted guide mechanism that interacts with a slide that is prestressed against said slotted guide mechanism, the slotted guide mechanism including at least one initial bevel that is divided into first and second bevel sections and a central bevel that is angled away from the at least one initial bevel, wherein the first bevel section is arranged substantially at an angle of 50 degrees with respect to an axis of movement of said slide in an unactuated state of the shift paddle so that an initial resistance is imparted to the shift paddle through the slide against the first bevel section when starting an actuation of the shift paddle, wherein the second bevel section is arranged substantially at an angle of 70 degrees to the axis of movement of the slide in the unactuated state of the shift paddle, wherein a kink at an intersection between the first and second bevels sections causes a change in the resistance imparted to the shift paddle, and wherein the central bevel imparts a resistance to further movement of the shift paddle as the slide comes to bear against the central bevel.

* * * * *